United States Patent
Magori et al.

[11] Patent Number: 6,087,979
[45] Date of Patent: Jul. 11, 2000

[54] RANGEFINDER

[75] Inventors: Valentin Magori; Patric Heide, both of München, Germany

[73] Assignee: Siemens Aktiengesellschaft, Munich, Germany

[21] Appl. No.: 09/029,912

[22] PCT Filed: Sep. 6, 1996

[86] PCT No.: PCT/DE96/01675

§ 371 Date: Mar. 9, 1998

§ 102(e) Date: Mar. 9, 1998

[87] PCT Pub. No.: WO97/09638

PCT Pub. Date: Mar. 13, 1997

[30]     Foreign Application Priority Data

Sep. 7, 1995 [DE] Germany ............... 195 33 122

[51] Int. Cl.[7] .................................................. G01S 13/36
[52] U.S. Cl. ..................... 342/128; 342/118; 342/127
[58] Field of Search ................................ 342/118, 125, 342/126, 127, 128, 129, 135

[56]         References Cited

U.S. PATENT DOCUMENTS

| | | | |
|---|---|---|---|
| 4,054,878 | 10/1977 | Diehl | 342/142 |
| 4,205,316 | 5/1980 | Peperone | 342/129 |
| 4,360,812 | 11/1982 | Peperone | 342/128 |
| 4,682,175 | 7/1987 | Lazarus | 342/165 |
| 4,860,017 | 8/1989 | Grudkowski | 342/201 |
| 4,895,441 | 1/1990 | Allen, Jr. | 356/5.09 |

OTHER PUBLICATIONS

"Signalverarbeitung mit akustischen Oberflächenwellen", Peter Schmitt Bauelemente der Elektronik, nachrichten elektronik 34, 1980 vol. 8, pp. 263–266.

"Taschenbuch der Hochfrequenztechnik", K. Lange et al., Springer Verlag, Berlin Heidelberg, New York, fifth edition, p. 305.

*Primary Examiner*—John B Sotomayor
*Attorney, Agent, or Firm*—Herbert L. Lerner; Laurence A. Greenberg

[57]         ABSTRACT

A signal source produces a frequency-modulated signal. The signal is supplied to a transmit/receive unit and transmitted. A surface-wave element produces a signal delayed by a delay from the frequency-modulated signal. A mixer mixes the delayed signal with the received signal and outputs the mixed signal to an evaluation device. The delay is preferably equal to the propagation time of a signal on the measurement path. The coherence length of the ranging apparatus is thereby substantially improved.

11 Claims, 3 Drawing Sheets

RANGEFINDER

BACKGROUND OF THE INVENTION

Field of the Invention

The invention relates to a device for measuring range.

The prior art Meinke, Gundlach, Taschenbuch der Hochfrequenztechnik, 5th edition, Springer-Verlag, pages S3–S4 discloses a continuous-wave radar, which is also known as FM-CW radar. FM stands for frequency modulation and CW stands for continuous wave. A continuous-wave radar of this typo continuously transmits a radar signal whose frequency is varied continuously by the frequency modulation. The radar signal reflected by an object arrives at the radar sensor after the signal propagation time $t_L$ $$t_L = \frac{2L}{c}$$

where c=propagation velocity of the radar signal,

L=range of the continuous-wave radar from the object, and is compared there with the already present transmission frequency which has been varied in the meantime by the frequency modulation. The radar signal which, for example, has been transmitted at time $t_1$ at the frequency $f(t_1)$, in, at the time of its return $t_2=t_1+t_L$, compared with the transmitted signal with the frequency $f(t_2)$. The two signals are compared using a mixer. The frequency obtained at the output of the mixer is the mixing frequency $\Delta f$ of the two signals:

$$\Delta f = f(t_2) - f(t_1) = f(t_1+t_L) - f(t_1)$$

The mixing frequency $\Delta f$ is proportional to the range L between the object and the sensor. So that, for a given optimum object range L, the mixing frequency $\Delta f$ remains constant during a time interval, it is necessary for the frequency modulation to be linear as a function of time during the relevant interval, i.e. the frequency increases or decreases linearly as a function of time:

$$f(t+\Delta t) = f_0 + \alpha \cdot \Delta t$$

where $\alpha = df/dt = $ constant $f_o = $ base frequency.

An example of a suitable modulating signal would be a sawtooth oscillation.

Complex evaluation of the mixing frequency $\Delta f$, that is to say of the FM Doppler signal, gives rise, depending on whether the instantaneous frequency is increasing or decreasing, to positive or negative distance-proportional frequencies which can be distinguished from velocity-proportional frequencies due to the object's motion.

Problems arise when measuring very distant objects on account of the limited coherence length of the transmitted signal. This means, even if the frequency modulation of the transmitted signal is exactly linear as a function of time, statistical phase and frequency fluctuations $f_x(t)$ are superimposed on the transmitted signal:

$$f(t+\Delta t) = f_0 + \alpha \Delta t + f_R(t)$$

Fluctuations of this type result from the phase noise of the transmission oscillator. This means that, between two instants, the phase of the received signal can deviate from the expected value by a particular value which is commensurately greater as the phase noise of the oscillator becomes stronger and the time between the two instants becomes longer. The result of this is that, depending on the phase noise of the signal source, there is a time period after which the phase difference fluctuates so greatly that a meaningful measured value can no longer be determined. The propagation length of the microwave signal (=radar signal) corresponding to this time period is referred to as the coherence length. In the came of object ranges for which the signal propagation length exceeds the coherence length, it becomes very difficult if not impossible to measure the range.

The problem can be solved by equipping the transmitter with a low-noise oscillator. This implies a largo coherence length. However, the production of an oscillator of this type requires the use of expensive components.

Range finders having FM-CW radar are also described in U.S. Pat. Nos. 4,205,316 and 4,360,812.

SUMMARY OF THE INVENTION

The object of the invention is to provide a device for measuring range having improved coherence length.

The object is achieved by a device according to patent claims 1 or 2.

Advantageous refinements of the invention are given by the subclaims.

If the isolation of the transmit/receive switch is insufficient, a bistatic antenna arrangement may be provided. The transmit/receive switch may, for example, have a circulator or a directional coupler. If uncontrolled coupling of the transmitted power to the mixer is to be avoided, then the transmit/receive switch may be connected between the signal source, the mixer and the antenna

BRIEF DESCRIPTION OF THE DRAWINGS

The invention is explained in more detail below with reference to several figures, in which:

FIG. 7 shows a transmit/receive unit as suitable for the devices for measuring range according to FIG. 1, FIG. 4 or FIG. 5a.

DESCRIPTION OF THE PREFERRED EMBODIMENTS

Figure 6:
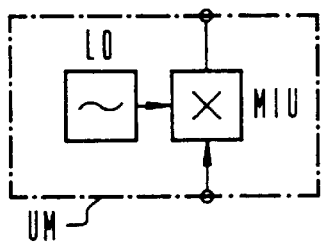
FIG. 6 shows a frequency converter as suitable for the devices according to FIG. 1 or FIG. 4.

The device according to the invention for measuring range with improved coherence length has a signal generator SQ which produces a frequency-modulated signal $S_{VCO}$ with frequency $f_{VCD}(t)$. If the converter UM according to FIG. 6 is not connected between the signal source SQ and the transmit/receive unit SES, then:

$$f_{VCD}(t) = f_r(t)$$

$$S_{VCO} = S_S$$

where $f_T(t)$=instantaneous frequency of the transmitted signal $S_S$, also referred to an transmitted frequency.

At time $t_1$, the transmitted signal $S_S$ with instantaneous frequency $f_T(t)$ is fed to the antenna A via the circulator ZIR which forms part of the transmit/receive unit SES. This antenna transmits the transmitted signal $S_S$. At the target object MO, which is separated from the antenna A by a range L, the transmitted signal is reflected and received by the antenna A. The circulator ZIR ensures that the signal $S_R$ received at time $t_2=t_2+t_L$ with frequency $f_T(t_1)$ reaches the mixer MI. Further, at time $t_1$, the frequency-modulated signal with frequency $f_{VCO}(t_1)$ delivered by the signal source SQ is fed to a surface-wave element OFW having a delay $\tau$. The frequency-modulated signal $S_{VCO}$ thus delayed by the delay $\tau$ is mixed at time $t_2$ using the mixer M1 with the signal $S_Z$ received at time $t_2$, filtered by means of a low-pass filter TP and fed to an evaluation unit AE. The low-pass filter TP may, if appropriate, be omitted.

The delay $\tau$ is of a value such that the difference between the delay $\tau$ and the signal propagation time $t_L$ is less than or at most equal to the coherence time $t_Z$ which is proportional to the coherence length:

$$|\tau - t_L| \leq t_z \text{ (coherence condition)}$$

With known delay $\tau$ and known frequency excursion $\alpha$, the signal propagation time $t_L$ for the measurement path can thus be calculated as:

$$t_L = \tau \pm \Delta f / \alpha$$

The range L of the target object MO from the antenna A is given by one half of the length of the measurement path and therefore by one half of the signal propagation time $t_L$.

Figure 2:
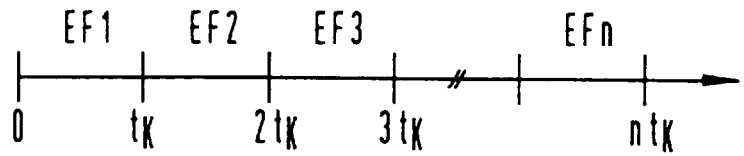
FIG. 2 shows a range diagram with n different range windows.

By using a surface component OFW in the manner presented above, it is possible for the usable range interval, also referred to as range measurement window EF, whose width in restricted owing to the restricted coherence length, to be shifted arbitrarily through the selection of the delay $\tau$. This corresponds to focusing the measurement on a selectable range measurement window EF1 . . . EFn (cf. FIG. 2). The width of a range window is, an before, predetermined by the coherence time $t_K$ of the radar signal.

The OFW delay line carries the delayed signal internally as an acoustic surface wave whose propagation velocity's orders of magnitude are less than the velocity of light, so that the requisite time delay $\tau$ can be produced in an extremely small component.

In order to cover a large measurement range, it is necessary to have a plurality of range measurement windows ZF1, ZF2, . . . , EFn and therefore a plurality of delay lines with different delays $\tau_1 \ldots \tau_m$.

Figure 1:
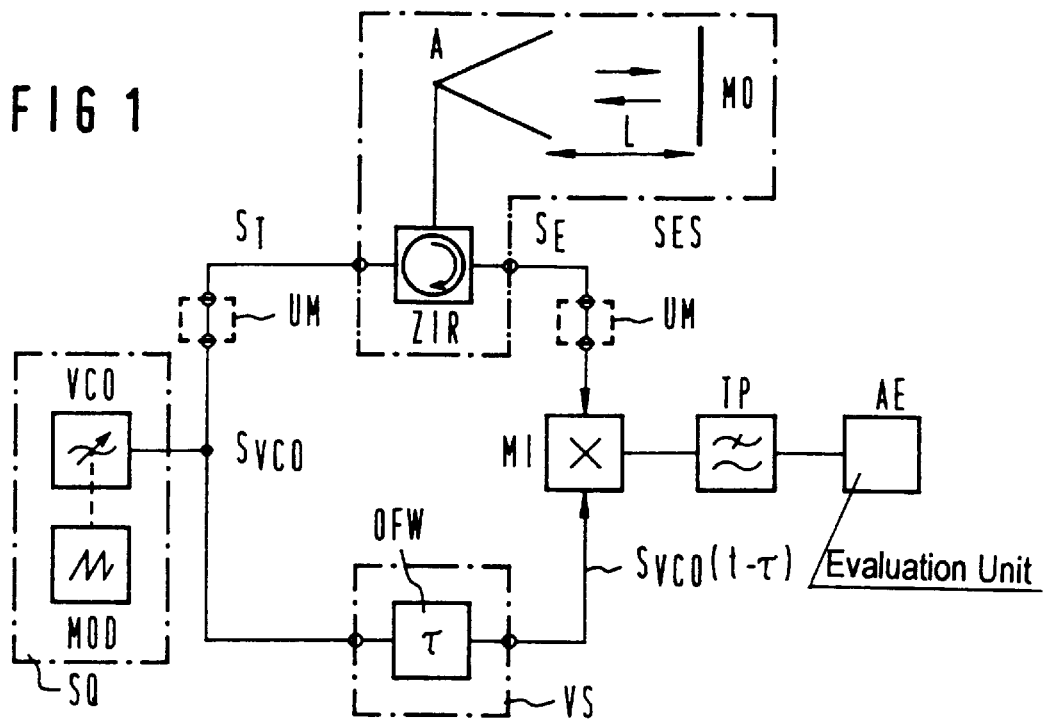
FIG. 1 shows the basic structure of the device for measuring range according to the invention.
Figure 3:
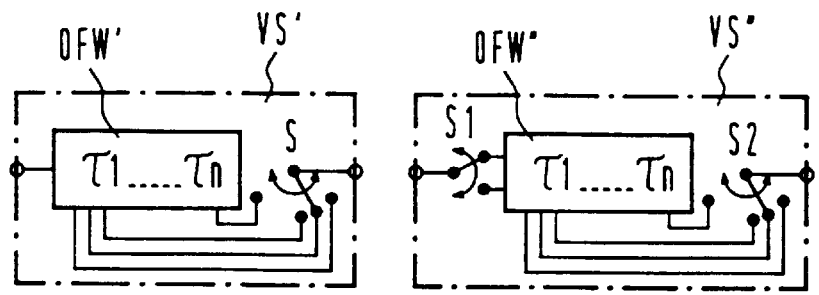
FIG. 3 shows two different configurations of a surface-wave element, FIG. 4 shown a further configuration of the device for measuring range according to the invention.

One possible embodiment is represented in FIG. 3. The delay line VS having the surface-wave element OFW in FIG. 1 is replaced by a delay line VS' having a surface-wave element OFW' in conjunction with a change-over switch S, or by a delay line VS" having a surface—wave element OFV" in conjunction with two changeover switches S1 and S2. Depending on the desired range measurement window, the changeover switch S, or the changeover switches S1 and S2, is or are met to the corresponding delay.

The delay times between the feed and each tap of the surface-wave elements OFW' OFW' and OFW" are accurately known. From each tap, it is possible to form the mixing signal produced by mixing the transmitted signal delayed on the measurement path and the frequency-modulated signal SVCO delayed on the delay line VS, VS' or VS". The delay line chosen is in each case the section of the tapped surface-wave element OFW, OFW' or OFW" whose delay most closely approximates the measurement path in terms of the signal propagation time $t_L$.

If a plurality of objects lie on the measurement path, then a plurality of ranges thus need to be measured at the same time, and the delay lines will be adapted one after the other to the different ranges. The signals from the various taps of the surface-wave elements OFW', OFW" can, as represented in FIG. 3, be connected sequentially to the mixer MI using one changeover switch S or two changeover switches S1, S2.

Likewise, each tap may have its own mixer, in which came all the mixing signals are fed in parallel to the evaluation unit AE (not represented in the figures).

The ranges given by the measured signal propagation time $t_L$, for which:

$$t_L = \tau_n \pm \Delta t = \tau_n \pm \Delta f_n / \alpha$$

where $\tau_n$=delay of the n-th tap, and $\alpha f_n$=the mixing frequency measurable at the n-th tap.

For the signal propagation time $t_L$ on the measurement path, an ambiguity arises due to the uncertainty as to whether the echo or the delayed signal had a shorter or a longer propagation time. This uncertainty can be removed as follows:

1st possibility

The signal is evaluated in complex fashion by using an IQ mixer.

2nd possibility

A variation of the delay is carried out, for example by switching over between different input converters of the delay line, as shown on the right for the delay line VS" according to FIG. 3, by means of which the delay can be increased or decreased within small limits. Both when increasing and decreasing the delay, the appropriate sign is that which, for a change in the delay, respectively gives the correct variation in the signal propagation time $t_L$.

The signal source SQ contains a modulator MOD which drives a voltage-controlled oscillator VCO with a preferably sort of sawtooth signal. At its output, this oscillator delivers a frequency-modulated signal $S_{VCO}$. The modulator MOD produces the modulating signal.

In the device for measuring range according to FIG. 1, the converter UM according to FIG. 6 can be used at the positions referenced in FIG. 1. The converter UM has a local oscillator LO which produces a signal $S_{LO}$ having a frequency $f_{LO}$ which is above the frequency $f_{VCO}(t)$ produced by the signal source SQ. Using the converter UM, the frequency $f_{VCO}(t)$ of the signal $S_{VCO}$ is up-mixed with the transmitted signal $S_S$ having instantaneous frequency $f_T(t)$. This has the advantage that some of the sensor components can be operated in a lower-frequency range relative to the transmitted frequency. But this is more convenient in practice.

Using a second converter, the received signal $S_E$ is down-mixed with the signal $S_{LO}$ from the local oscillator LO. There are thus once more two signals in the base frequency band at the mixer MI or MI1.

One local oscillator LO is sufficient for up-mixing and down-mixing the signals.

Figure 7:
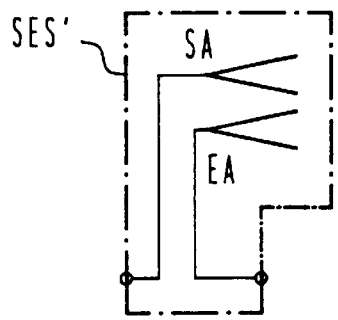

The bistatic transmit/receive unit SZS' according to FIG. 7 can replace the monostatic transmit unit SES according to FIG. 1. The bistatic transmit/receive unit SES' has the advantage of a higher degree of isolation with respect to the circulator ZIR of the monostatic receive unit SES. In the came of the bistatic transmit/receive unit SES', one transmit antenna SA and one receive antenna EA are necessary.

Figure 4:
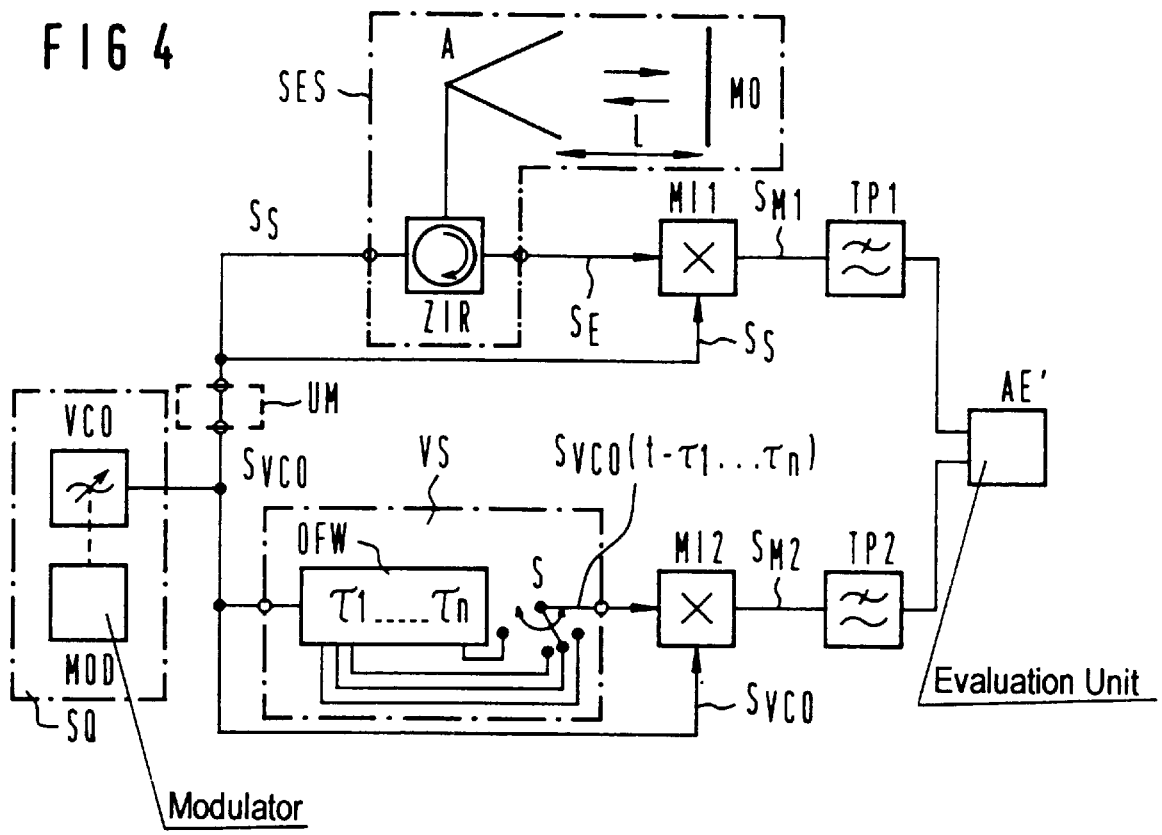

The device for measuring range according to FIG. 4 differs from the device for measuring range according to FIG. 1 in that the received signal $S_E$ is mixed with the transmitted signal $S_S$, and the delayed signal $S_{VCO}(t\text{-}\tau_1 \ldots \tau_o)$ is mixed with the undelayed signal $S_{VCO}$ from the signal source SQ. The outputs of the mixers MI1 and MI2 are fed via two optional low-pass filters TP1 and TP2 to a common evaluation unit AE'. The two mixing signals $S_{M1}$ and $S_{M2}$ from the mixers MI1 and MI2 are evaluated in the evaluation unit AE' by corresponding software. The evaluation unit AE' determines which instantaneous phase on the corresponding tap of the delay line VS is actually present, and which would instantaneously be expected for the given delay of the delay line VS or of a tap. From these two values, a correction is calculated which, within the coherence length, also applies with high probability for the measurement path.

The device according to the invention for measuring range according to FIG. 4 can be supplemented by a converter UM according to FIG. 6 at the positions shown in FIG. 4. As already described above, this has the advantage that some of the sensor components can be operated in a lower-frequency range relative to the transmitted frequency.

Figure 5:
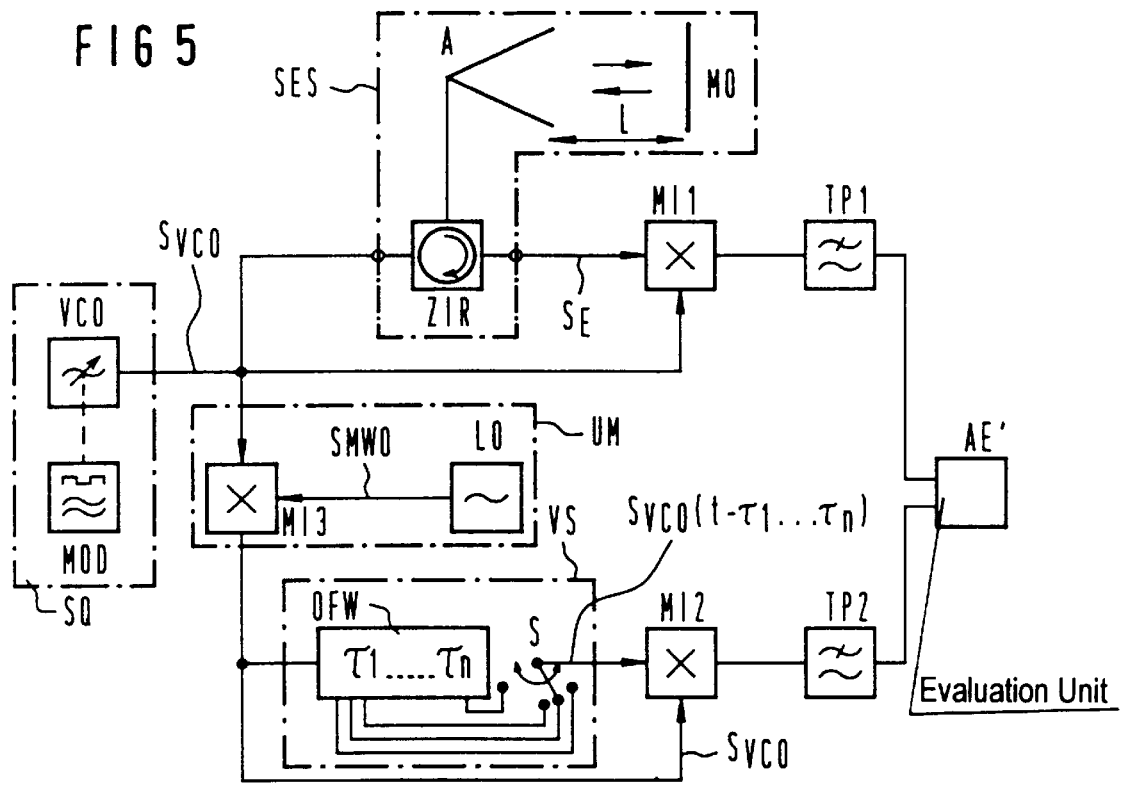
FIG. 5 shows a further configuration of the device for measuring range according to the invention.

The device for measuring range according to FIG. 5a differs from the device for measuring range according to FIG. 4 in that an additional mixer MI3 is arranged between the surface-wave element OFW and the signal source SQ, using which the frequency-modulated signal $S_{VCO}$ can be down-mixed using a local oscillator LO into an intermediate frequency range suitable for further processing with a surface-wave element.

The mixer MI3 can be designed both as a fundamental mixer and as a so-called harmonic mixer. Using a harmonic mixer has the advantage that a lower frequency can be selected for the local oscillator LO, so that the local oscillator LO is more economical to produce.

In the devices for measuring range shown in FIGS. 4 and 5a, the monostatic transmit/receive unit SES can again be replaced by a bistatic transmit/receive unit SES' according to FIG. 7.

Typical frequencies for the device for measuring range are 24, 60 or 76 GHz.

The range measurement interval is typically between 0 and 500 m.

Problems may arise when a plurality of range measurement devices are being operated at the same time by a plurality of users. If a first range measurement device transmits into the reception range of a second range measurement device, then this leads to interference which, even in the side lobes, can achieve stronger reception levels than the comparatively weak radar echo. In order to suppress this interference, an irregular modulation signal profile can be selected intentionally.

Further possibilities for improving interference suppression are:

1. The modulation signal from the modulator MOD can be varied using a fixed pattern.
2. The modulation signal from the modulator MOD can be varied using a random-sequence generator.
3. The profile of the modulating voltage may be switched over after "consultation" with the interfering transmitter which, for its part, is likewise interfered with. Functions suitable for different users are ones which correlate am little as possible with one another.

We claim:

1. A ranging apparatus, comprising:
    a signal source producing a frequency-modulated signal, said signal source defining a coherence length;
    a transmit/receive unit connected to said signal source;
    a surface-wave element producing from the frequency-modulated signal a delayed signal which is delayed by a given delay;
    a surface-wave element defining the given delay such that a difference between the given delay and predetermined signal propagation times is less than the coherence length predetermined by the signal source;
    a mixer connected to said transmit/receive unit for mixing the received signal and the delayed signal; and
    an evaluation unit connected to said mixer, said evaluation unit assigning to a supplied frequency signal a range to be measured.

2. The device according to claim 1, wherein said surface-wave element includes a plurality of outputs each issuing a delayed signal with a different delay, and a changeover switch for selectively connecting one of said outputs to said mixer for mixing the delayed signal.

3. The device according to claim 1, which further comprises: means connected between said signal source and said transmit/receive unit for raising a frequency of the frequency-modulated signal; and
    means connected between said transmit/receive unit and said mixer for lowering a frequency of the received signal.

4. The device according to claim 1, which further comprises
    a further surface-wave element for producing a signal delayed by a further delay from the frequency-modulated signal; and
    two changeover switches connected between said signal source and said mixer for selectively connecting one of said surface-wave elements between said signal source and said mixer.

5. The device according to claim 1, which further comprises:
    at least one further surface-wave element producing from the frequency-modulated signal a signal delayed by a further delay; and
    each of said surface-wave elements having a mixer assigned thereto which is connected to said evaluation unit.

6. A ranging apparatus, comprising:
    a signal source producing a frequency-modulated signal, said signal source defining a coherence length;
    a transmit/receive unit connected to said signal source;
    a first mixer for mixing a received signal (SE) with the frequency-modulated signal;
    a surface-wave element producing a delayed signal delayed by a given delay from the frequency-modulated signal;
    said surface-wave element defining the given delay such that a difference between the given delay and predetermined signal propagation times is less than the coherence length defined by said signal source;
    a second mixer for mixing the delayed signal, with the frequency-modulated signal; and
    an evaluation unit connected to said first and second mixers, said evaluation unit calculating a correction value from a signal supplied by said second mixer and, while taking account of this correction value, assigning a range to be measured to a frequency signal supplied by said first mixer.

7. The device according to claim 6, wherein said surface-wave element includes a plurality of outputs each issuing a delayed signal with a different delay, and a changeover switch for selectively connecting one of said outputs to said second mixer.

8. The device according to claim 6, which further comprises means connected between said signal source and said transmit/receive unit for raising a frequency of the frequency-modulated signal.

9. The device according to claim 6, which further comprises means connected between said signal source and said surface-wave element for lowering a frequency of the frequency-modulated signal.

10. The device according to claim 6, which further comprises:

a further surface-wave element for producing a signal delayed by a further delay from the frequency-modulated signal; and two changeover switches connected between said signal source and said second mixer for selectively connecting one of said surface-wave elements between said signal source and said second mixer.

11. The device according to claim 6, which further comprises:

at least one further surface-wave element producing from the frequency-modulated signal a signal delayed by a further delay; and each of said surface-wave elements having a mixer assigned thereto which is connected to said evaluation unit.

* * * * *